Dec. 31, 1940.   R. L. GUNTER   2,226,856
ELECTRICALLY OPERATED CONTROL DEVICE
Filed Aug. 12, 1939   2 Sheets-Sheet 1

Inventor
ROBERT L. GUNTER,
Attorneys

Dec. 31, 1940.   R. L. GUNTER   2,226,856
ELECTRICALLY OPERATED CONTROL DEVICE
Filed Aug. 12, 1939   2 Sheets-Sheet 2

Inventor
ROBERT L. GUNTER,
By Arthur P. Knight and
Alfred W. Knight
Attorneys

Patented Dec. 31, 1940

2,226,856

UNITED STATES PATENT OFFICE 2,226,856

ELECTRICALLY OPERATED CONTROL DEVICE

Robert L. Gunter, Los Angeles, Calif.

Application August 12, 1939, Serial No. 289,932

13 Claims. (Cl. 175—335)

This invention pertains to electrically operated control devices.

A general object of the invention is to decrease power consumption and noise in an electrically operated control device by providing such a control device with a main operating coil which operates only during movement of a member to be controlled and providing a holding coil of lesser dimensions than the main coil to hold the member to be controlled in the position to which it has been moved by the main operating coil.

A more particular object of the invention is to provide an electrically operated control device having a plurality of members to be controlled which are all moved to one position by the action of a main operating coil and are selectively held in the one position by the action of individual holding coils of lesser dimensions than the main operating coil.

A more specific object of my invention is to provide, according to one embodiment thereof, a solenoid operated valve having a plurality of ports each opened and closed with a separate valve plunger, with a main operating solenoid for simultaneously moving all of the plungers to a position opening the ports when a selected one of the ports is to be maintained open, and with a separate holding solenoid for holding the selected one of the plungers in its position opening its associated port when the plunger is moved to the last-named position and the main operating solenoid is deenergized.

Another object of the invention is to provide an electrically operated control device with movable actuating means operated by a main operating coil for engaging a plurality of members to be controlled and simultaneously moving said members to one position.

A further object of the invention is to provide an electrically operated control device with a plurality of members to be controlled which, upon the selection of any one of the members to be controlled for holding in one position, will cause energization of a main operating coil which will through movable actuating means move all of the members to be controlled to their corresponding one position and which will then cause deenergization of the main operating coil and allow the unselected ones of the members to be controlled to return to their original positions while holding the selected one of the members to be controlled through the action of an individual holding coil.

Another object of the invention is to provide an improved solenoid operated control device in which a member to be controlled is moved to one position by a main operating solenoid through movable actuating means at which time the main solenoid is deenergized and the member to be controlled is held in position through the action of a holding solenoid of lesser dimensions than the main solenoid.

Further objects and advantages of the invention will either be brought out specifically in the ensuing description or will be apparent therefrom.

My apparatus comprises one or more members to be controlled such as valve plungers, levers or the like, each of which is movable from a first position to a second position and is biased toward its first position. A separate holding coil is provided for each member to be controlled and is adapted to hold that member in its second position when energized by an electric current and after its associated member has been moved to its second position. A main operating coil, usually of greater dimensions than a holding coil, is adapted upon electrical energization to move movable actuating means associated with each member so as to move said actuating means away from a rest position to cause it to move each member toward its second position where a selected member is held through the action of its associated holding coil. Suitable switch means is provided for deenergizing the main operating coil when a selected member is in its second position. This allows a selected one of the members to be held in its second position by its associated holding coil. Upon deenergization of the main operating coil, the movable actuating means then returns to its rest position independently of any member, although any member not held will, due to its bias, return to its first position at the same time. The switch means is preferably operated by the movement of a selected one of the members either by mechanical or magnetic action, as will be brought out more fully subsequently. My apparatus further comprises a plurality of electric circuits associating the main operating coil and each holding coil, including selector switch means for initiating the operation of the main operating coil and causing the selective energization of the holding coils, as will be more particularly pointed out hereinafter.

The above and other features of my invention will become manifest when my invention is described by way of example in conjunction with the accompanying drawings, in which.

Figures 1, 2:
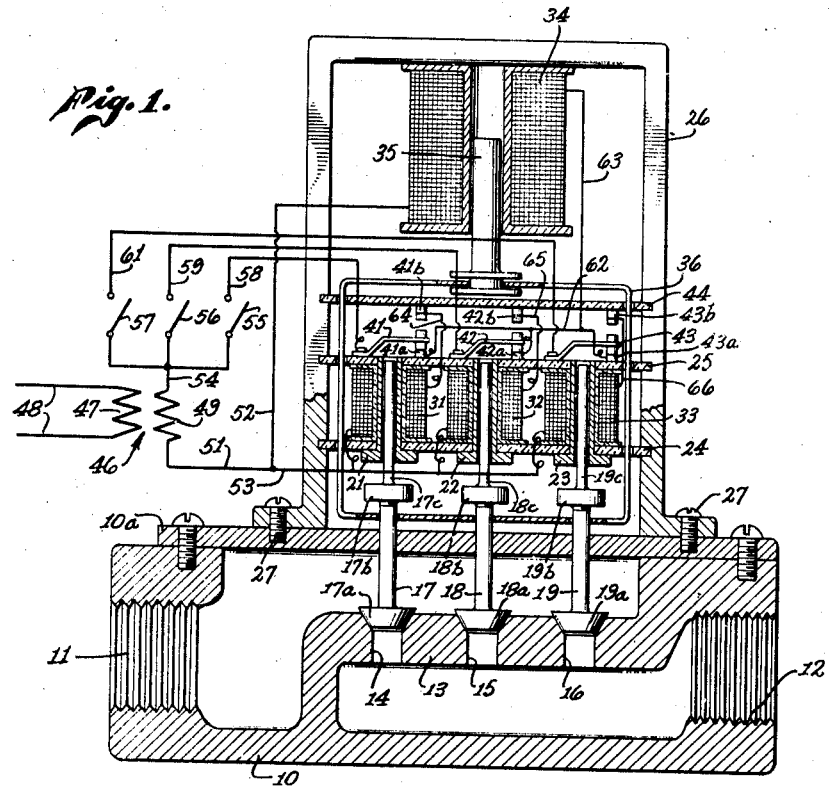
Fig. 1 is a partly diagrammatic vertical section through a variable flow valve which embodies construction according to my invention.
Fig. 2 is a sectional view like Fig. 1, with parts of the valve omitted, illustrating a modified switching arrangement.

Referring to Fig. 1, a variable flow valve is shown as comprising a casing 10 provided with inlet and outlet openings 11 and 12 and with a partition 13 bored to provide valve openings or ports 14, 15, and 16. Valve plungers 17, 18, and 19, comprising members to be controlled, extend through a removable cover 10a for the casing 10 and are provided with valve closures 17a, 18a, and 19a, respectively, for closing the respective valve openings 14, 15, and 16 when the plungers 17, 18, and 19 are in their first or down positions, to which positions they are biased by the action of gravity or by other equivalent means. The upper ends of the respective plungers are provided with flange portions 17b, 18b, and 19b of magnetically permeable material, which may be threadedly secured to the plungers to provide for facile disassembly of the device. These flange portions serve the dual purpose of acting as magnetic armatures to hold the respective plungers in their second positions holding open their respective valve openings and also providing projections for engagement with movable actuating means for lifting the valve plungers to their respective second positions, as will be brought out more fully hereinafter. The upper ends of the respective valve plungers are also provided with push pins 17c, 18c, and 19c of brass or other non-magnetic material, which may be considered as extensions of said members and which extend through cores 21, 22, and 23, respectively.

The cores 21, 22, and 23 are shown held in position between insulating strips 24 and 25 which are positioned in notches provided in the walls of a frame member 26 which is removably secured to the casing 10 through the agency of screws 27 extending into the cover 10a. The cores 21, 22, and 23 are positioned within individual holding coils or solenoids 31, 32, and 33, which are shown positioned between the strips 24 and 25 and the windings thereof are suitably insulated from one another and from the cores.

Suitably secured to the frame 26, or otherwise positioned above the holding solenoids, is a main operating coil or solenoid 34 which is preferably positioned with its axis parallel and in the same plane as the axes of the holding solenoids. The main solenoid 34 is provided with a longitudinally movable core 35 of magnetically permeable material which is secured to movable actuating means such as a rectangularly shaped yoke 36 positioned about the holding coils and provided with openings or slots through which the valve plungers 17, 18, and 19 extend. The openings or slots are of such size as to allow free sliding movement of the plungers and yet engage the flanges 17b, 18b, and 19b so as to lift the respective plungers upon upward movement of the solenoid core 35.

The holding solenoids are provided with separate switch means comprising movable spring contact arms 41, 42, and 43 respectively, which are mounted on the insulating strip 25 and normally engage lower contact members 41a, 42a, and 43a respectively. The lower contact members are also mounted on the insulating strip 25 and electrically insulated from one another and from the spring contact arms. Suitably mounted above the insulating strip 25 is another insulating strip 44 holding fixed contacts 41b, 42b, and 43b, adapted to be contacted by the spring arms 41, 42, and 43 respectively upon the upward movement thereof.

My apparatus further comprises a plurality of electric circuits which are adapted to be selectively energized to cause movement of the valve plungers, 17, 18, and 19 to their second positions, and the selective holding of one or more of the plungers in their second positions. For the purpose of supplying electrical energy to the respective coils I have shown a transformer 46 provided with a primary winding 47 which may be connected to a source of power through leads 48. The transformer is further provided with a secondary winding 49 of which one lead 51 is connected through a conductor 52 to one side of the main operating solenoid 34 and through a lead 53 to one side of each of the holding solenoids 31, 32, and 33. The remaining lead 54 of the secondary 49 is connected to one side of each of three switches 55, 56, and 57. The other sides of these switches are respectively connected through conductors 58, 59, and 61 to the spring switch arms 41, 42, and 43. The lower fixed contacts 41a, 42a, and 43a are shown connected together by a conductor 62 which is connected through a conductor 63 to the remaining side of the main operating solenoid 34. The upper fixed contacts 41b, 42b, and 43b are connected to the remaining sides of the respective holding solenoids 31, 32, and 33 through conductors 64, 65, and 66.

Assuming for example that it is desirable to restrict the flow through the casing 10 to that obtained with only one of the valve ports by raising the plunger 17 for example and holding it in its second position, switch 55 is closed. This completes a circuit through conductor 58, switch arm 41, contact 41a, conductor 62, conductor 63, solenoid 34, conductor 52, lead 51, and transformer secondary 49, back to switch 55. This energizes the solenoid 34 and causes movement of the core 35 in an upward direction which lifts the yoke 36, causing the same to engage the flanges 17b, 18b, and 19b, of the plungers 17, 18, and 19 and lift them to a position where the magnetically permeable flanges 17b, 18b, and 19b are in close proximity to the holding solenoid cores 21, 22, and 23, and at the same time causes the push pins 17c, 18c, and 19c to lift the spring contacts 41, 42, and 43 so that they break connection with the fixed lower contacts 41a, 42a, and 43a. The momentum of the plungers causes the respective spring contacts 41, 42, and 43 to establish connection with the upper fixed contacts 41b, 42b, and 43b so that although the circuit to the main lifting solenoid is broken when the push pin 17c causes the spring contact 41 to break the connection with the fixed contact 41a, contact will still be established between the spring contact 41 and the fixed contact 41b. This establishes a circuit through the individual holding solenoid 31 which may be traced from the transformer secondary 49 through conductors 51 and 53, holding solenoid 31, conductor 64, contact 41b, spring contact 41, conductor 58, switch 55, and lead 54.

When the holding solenoid 31 is energized, the magnetically permeable flange 17b is sufficiently near to the solenoid core 21 that the plunger 17 will be held in its second position opening the valve port 14. Since the circuit through the main solenoid 34 has now been broken, its core 35 and the attached yoke 36 which is biased to a down position by gravity will return to its rest position as shown in Fig. 1 independently of the plungers and the unselected ones of the valve plungers (18 and 19) will also return to their first positions closing their respective ports 15 and 16.

Each of the conductors 58, 59 and 61 is part of a main circuit through the main coil 34 when energized through the selector switch means comprising switches 55, 56, and 57. Each of these main circuits is divided into a pair of parallel-connected branch circuits. One of these parallel-connected branch circuits leads through the main coil and the other leads through the particular holding coil associated with that main circuit. The connection from a main circuit to either branch circuit is accomplished through the spring switch arm to which the main circuit is connected. Thus the spring switches are operable to alternatively connect the main circuit through the main coil or through a particular holding coil depending upon the position of the two position switch means as defined by each of the spring switches 41, 42, and 43.

This arrangement does much to eliminate the noise experienced with such valves during the holding operation, since the holding solenoids may be made of relatively small dimensions as compared to a solenoid which may be used both for the lifting and holding operations. At the same time there is an important saving in power, since the main solenoid 34 is only on during the movement of a valve plunger from its first to its second position, and a small individual solenoid with its low power consumption is used for the continuous holding operation.

Assuming that the switch 55 is still closed, the plunger 17 will be returned to its first position when this switch is opened as shown in Fig. 1 and all the coils will then be deenergized. It will also be noted that a failure in the power supplied to the leads 48 will cause the valve plunger 17 to drop to its position closing the port 14.

From the above description it should now be obvious that upon closing any one of the switches 55, 56, or 57, or any number thereof, the yoke 36 will move to place all of the plungers 17, 18, and 19 in their second positions and, depending upon the number of switches closed, the selected one or ones of the plungers will be held in their second positions and the unselected one or ones will return to the first position. Since each of the circuits through the switches 55, 56, and 57 is independent of the other, the operation of any one of the valve plungers may be obtained independently of the others, and the plungers need not be sequentially selected for holding in their second positions.

With the arrangement illustrated in Fig. 1, the operation of the selector switch means defined by the separate switches 55, 56, and 57 first causes energization of the main operating solenoid 34 which is subsequently deenergized through the mechanical action of the push pins 17c, 18c, and 19c, which move their respective spring contacts 41, 42, and 43 into electrical contact with the upper set of fixed contacts 41b, 42b, and 43b to cause selective energization of the holding coils 31, 32, and 33. Thus with this arrangement the operation of the selector switch means causes the sequential energization of the main operating solenoid, to move the valve plungers upwardly, and the deenergization of the main operating solenoid after the plungers have been moved upwardly, and the subsequent energization of a selected one of the holding coils.

In Fig. 2 an apparatus arrangement is illustrated in which the selection of any one of the valve plungers for holding immediately energizes both the selected holding solenoid and the main operating solenoid. The mechanical movement of the plunger causes it to deenergize the main operating solenoid as soon as the plunger is in its second position so as to be held by its associated holding solenoid. Referring now to Fig. 2, a valve actuating mechanism is illustrated which is, to all intents and purposes, a substantial mechanical duplicate of the one illustrated in Fig. 1 except that the upper insulating strip 44 (shown in Fig. 1) and its contacts 41b, 42b, and 43b have been eliminated. In Fig. 2 holding solenoids 71, 72, and 73 are shown positioned between spaced insulating strips 74 and 75 which are supportingly engaged by a frame member 76 which is attached to a valve casing cover 77. Valve plungers 78, 79, and 81 are shown extending through the cover 77 and provided at their upper ends with push pins 78c, 79c, and 81c respectively, which may be considered as extensions of the plungers. The push pins extend through magnetically permeable cores 82, 83, and 84 of the respective holding solenoids, and are adapted on their upward movement to move spring switch arms 85, 86, and 87 upwardly. The spring switch arms are shown attached to the insulating strip 75. Fixed contacts 88, 89, and 91 are shown attached to the insulating strip 75 and respectively associated with the spring switch contacts 85, 86, and 87 so as to establish electrical connection therewith when the members to be controlled such as the valve plungers 78, 79, and 81 are in their first or lower position as shown. A main operating solenoid 92 is shown suitably secured to the frame member 76 at a position above the holding solenoids and provided with a movable magnetically permeable core 93 which is attached to movable actuating means comprising a yoke 94 which encompasses the holding solenoids and engages the members 78, 79, and 81 slidingly and is adapted to cause upward movement thereof by engaging their respective flanges of magnetically permeable material 78b, 79b, and 81b.

A transformer 95 is provided with a primary 96 adapted for connection to a power source and a secondary 97 having one side connected through conductors 98 and 99 to one side of each of the holding solenoids 71, 72, and 73. The conductor 98 is also connected through a lead 101 to one side of the main operating solenoid 92. The remaining side of each of the holding solenoids is connected to its associated spring switch through conductors 102, 103, and 104, respectively. The fixed contacts 88, 89, and 91 are connected together through the agency of a conductor 105 which is connected through a lead 106 to the remaining side of the main operating solenoid 92. The remaining side of the transformer secondary 97 is connected by a lead 107 to one side of selector switch means comprising switches 108, 109, and 111 which are respectively connected by conductors 112, 113, and 114 to the spring switches 85, 86, and 87.

Assuming that it is desirable to hold the member 79 in its second position, switch 109 is closed, and a circuit through the secondary 97 is established through switch 109, lead 113, spring switch 86, fixed contact 89, conductors 105 and 106, main operating solenoid 92, conductor 101, conductor 98, and back to the remaining side of the secondary 97. This causes the core 93 to move upwardly and move the yoke 94 to carry the members 78, 79, and 81 to their second positions. At the same time, the closing of switch 109 causes the energization of holding solenoid 72 by the flow of current through leads 113 and 103 through the holding solenoid 72 and through leads 99 and 98 back to the transformer secondary 97. Hence, the selected holding solenoid is energized as soon as the selector switch means is closed. However, the holding solenoid does not produce sufficient pulling power to lift the selected member by itself.

The upward movement of the members to be controlled causes their associated push pins to break the circuits leading to the main operating solenoid through the spring switches 85, 86, and 87, so that the unselected ones of the members return to their first positions while the selected one, in this case the member 79, is held in its second position through the attraction between the core 83 and the flange 79b. At the same time, this holding operation maintains the spring switch 86 out of engagement with its fixed contact 89 so as to maintain the circuit through the main operating solenoid open. As soon as the main coil 92 is deenergized, the yoke 94 returns to its rest position as shown, independently of the valve plungers.

If it is desired to subsequently hold the members 78 and 81 in their second positions, this may be accomplished by closing switches 108 and 111, since all of the circuits operate independently of one another. Upon power failure or the opening of the switches 108, 109, or 111, the associated members to be controlled will fall to their first positions. In case of power failure, the selected members will return to their second positions upon the restoration of power, if the selector switch means is still closed.

Upon inspection of Fig. 2, it will be seen that there is a separate series circuit from each of the conductors 112, 113, and 114 through the holding coils 71, 72, and 73, respectively. These circuits are established selectively upon operation of the selector switch means defined by the switches 108, 109, and 111. A separate normally closed branch circuit is in parallel with each of these circuits and each of these circuits leads through the main coil 92. These circuits are normally closed by the respective spring contacts 85, 86, and 87 and are opened when the plungers are in their second positions.

Figure 3:
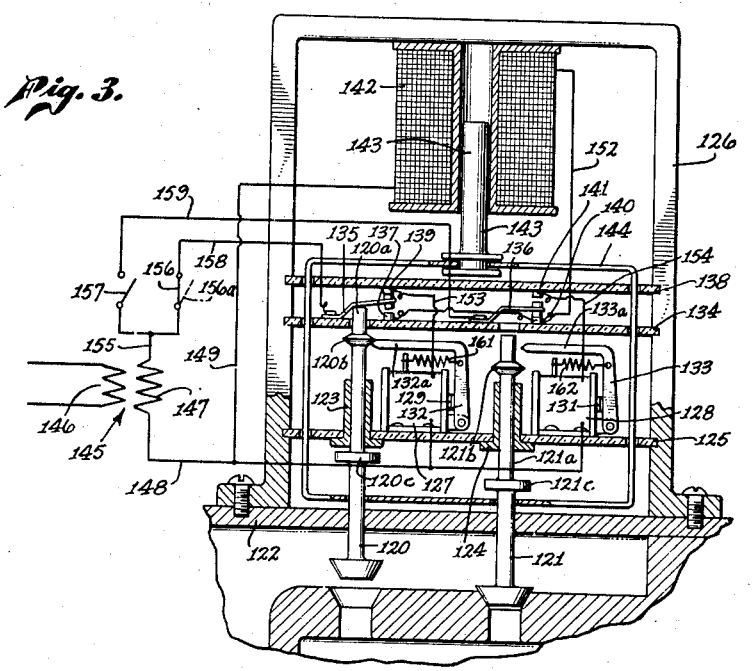
Fig. 3 is a partly diagrammatic sectional elevation of a variable flow valve embodying a modified form of construction for holding the valve plungers.

Referring to Fig. 3, an arrangement is illustrated with which the members to be controlled are held in their second positions through the operation of mechanical latches, actuated electromagnetically, rather than with holding solenoids as illustrated in Figs. 1 and 2. Members to be controlled, such as valve plungers 120 and 121 extending through a valve cover plate 122 are shown with their shank portions 120a and 121a extending through guides 123 and 124 respectively, which are mounted on a cross strip 125 held in position by a frame member 126. Holding coils 127 and 128 are mounted upon the strip 125 and are provided with horizontally extending magnetically permeable cores 129 and 131 respectively and with pivotally mounted armatures 132 and 133 respectively, of magnetically permeable material which are adapted for attraction to the cores 129 and 131 upon energization of the coils 127 and 128. The shank portions 120a and 121a of the members 120 and 121 are each provided with wedge-shaped dogs 120b and 121b respectively, in the form of rings located near the upper extremities thereof. The dogs are adapted for engagement with wedge-shaped projections 132a and 133a of the respective armatures 132 and 133 when the members 120 and 121 are in their upper positions. An insulating strip 134 is shown mounted above the strip 125 and in spaced relation thereto. Spring switches 135 and 136 are shown mounted on the strip 134 in position to be engaged by push pins 120a and 121a respectively and in contact with fixed lower contacts 137 and 140 respectively. Another insulating strip 138 is shown mounted on the frame member 126 in spaced relation to and above the strip 134 and carrying upper fixed contacts 139 and 141 respectively cooperating to make connections with the spring switches 135 and 136 when they are in their upper positions. A main operating solenoid 142 is shown mounted on the frame member 126 and positioned above the strip 138 and provided with an axially movable, magnetically permeable core member 143 which is attached to a yoke 144 which extends around the holding coils 127 and 128 and slidingly engages the members 120 and 121. The yoke 144 is adapted upon upward movement to engage flanges 120c and 121c on the members 120 and 121 and move them upwardly to their second position, in which position the member 120 is shown. In this embodiment, the flanges need not be magnetically permeable, since they are not used as holding armatures.

Electrically, the apparatus in Fig. 3 is wired in the same general manner as the apparatus illustrated in Fig. 1, that is, the two position switch means defined by the switches 135 and 136 operates to establish the alternate circuits first through the main coil and then through a particular holding coil as in Fig. 1. A transformer 145 is provided with a primary 146 which is adapted for connection to a source of electrical power, and with a secondary 147 which has one side connected through leads 148 and 149 to one side of the main operating solenoid 142. The lead 148 is also connected to a lead 151 which is connected to one side of each of the holding coils 127 and 128. The lower fixed contacts 137 and 140 are connected together and to the remaining side of the main operating solenoid through the agency of a conductor 152. The upper fixed contacts 139 and 141 are connected to the remaining side of each of the holding coils 127 and 128 through conductors 153 and 154 respectively. The remaining side of the transformer secondary 147 is connected through a conductor 155 to one side of a selector switch means comprising switches 156 and 157 which are respectively connected through conductors 158 and 159 to the spring switches 135 and 136.

Although switch 156 is shown in its closed position to better illustrate the operation of the apparatus, let us assume that this switch is in its open position as shown by the dot-dash lines at 156a, the member 120 will then be in its first or down position and the spring switch 135 will be in contact with the lower fixed contact 137. Upon movement of the switch 156 to its full-line position, the main operating solenoid 142 will be energized by current from the secondary 147 which passes through leads 148, 149, 152, contacts 137 and 135, lead 158, switch 156, and back to secondary 147 through conductor 155. This causes core 143 to be pulled upwardly by the solenoid 142 and the upward movement of the yoke 144 and the consequent movement of the members 120 and 121 to their upper or second position, in which position the member 120 is shown. The armature projection 132a is preferably biased toward the shank 120a by a spring 161 so as to be in ready holding position and yet allow the dog 120b to slide readily thereby on its upward travel.

Upward movement of the shank 120a causes the engagement therewith of the spring switch 135 and causes the switch to break contact with the fixed contact 137 to deenergize the main holding solenoid 142 and to subsequently make contact with the upper fixed contact 139 to energize the holding coil 127 and cause attraction between the core 129 and the armature 132 so that the normal downward bias on the member 120 will now be insufficient to cause the dog 120b to move past the projection 132a. Since the main operating solenoid 142 is now deenergized, the core 143 and the yoke 144 will fall to their first positions as shown. Even though the projection 133a is biased toward the shank 121b by a spring 162, this bias is sufficiently small so that the normal downward bias on the member 121 will allow the dog 121b to slide past the projection 133a so that the member 121 will return to its first position. The bias provided by the spring 161 is also of a comparable magnitude so that upon opening of the switch 156 the dog 120b will slide past the projection 132a and allow the member 120 to return to its first position.

Assuming now that the member 120 is held in its first position and that the switch 156 is closed as shown in Fig. 3, the member 121 may be moved to its second position and held there by closing switch 157. This operation should be obvious in view of the foregoing description.

Figure 4:
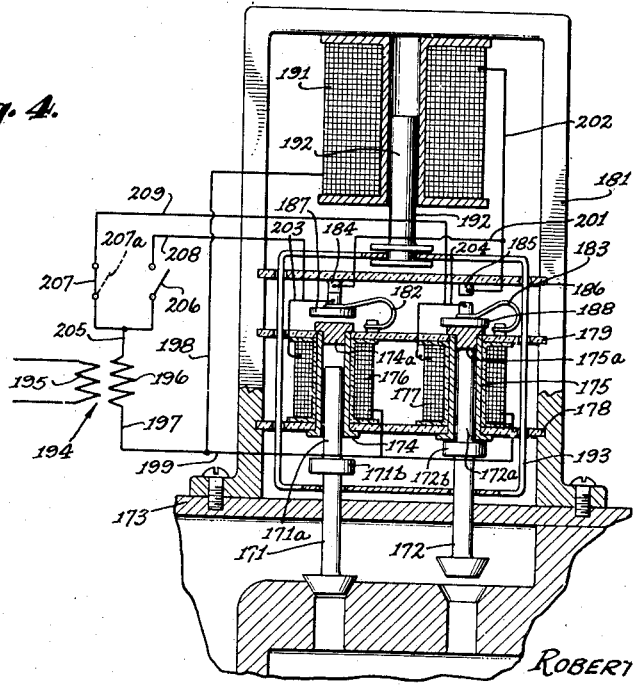
Fig. 4 is a sectional view like Fig. 3 illustrating a further modified form of construction for holding the valve plungers.

In Fig. 4 I have illustrated an apparatus arrangement which embodies the principles illustrated in Fig. 2 in that a selected one of the individual holding coils is energized immediately upon selection along with the main operating solenoid and this solenoid is deenergized as soon as the member to be controlled has moved to its second position. For all practical purposes the circuit arrangement and switching operation are the same as in Fig. 2. This form of apparatus is somewhat different than the other forms in that it illustrates the employment of a magnetically operated switch means for disconnecting the main operating solenoid when the selected member to be controlled is in its second position. In this figure members to be controlled, such as valve plungers 171 and 172, are shown extending through valve casing cover 173 and into cores of magnetically permeable material 174 and 175 of holding solenoids 176 and 177 respectively. With this arrangement, the upper portions 171a and 172a and the flange portions 171b and 172b of the members 171 and 172 respectively are of magnetically permeable material, and the members 171a and 172a are preferably of such length as to come in close proximity to core plugs 174a and 175a of magnetically permeable material provided in the respective cores 174 and 175. The holding solenoids 176 and 177 are shown positioned between insulating strips 178 and 179 which are mounted on a frame member 181. The upper strip 179 is shown carrying spring contact arms 182 and 183 which are adapted to establish electrical connection with upper fixed contacts 184 and 185 which are mounted on an insulating strip 186 which is supported by the frame member 181 in a position above and spaced from the strip 179. The spring arms 182 and 183 also carry armatures 187 and 188 of magnetically permeable material, which are normally spaced from the core plugs 174a and 175a respectively when the respective members 171 and 172 are in their normal down or first position. This is the position in which the member 171 is shown.

The apparatus also comprises a main operating coil or solenoid 191 which is suitably secured to the frame member 181 at a position above the strip 186 and is provided with an axially movable magnetically permeable core 192 which is suitably linked to a yoke 193 which encompasses the coils 176 and 177 and slidably engages the members 171 and 172. Upward movement of the core 192 is transmitted through the yoke 193 to cause upward movement of the members 171 and 172 when the yoke engages the flanges 171b and 172b.

For energization of this apparatus I may provide a transformer 194 having a primary 195 adapted for connection to a source of electric current, and a secondary 196 having one side connected through leads 197 and 198 to one side of the main operating solenoid 191. The lead 197 is also connected through a conductor 199 to one side of each of the holding solenoids 176 and 177. The upper fixed contacts 184 and 185 are connected together by a conductor 201 and to the remaining side of the main operating solenoid 191 through a conductor 202. The remaining side of each of the holding solenoids 176 and 177 are connected to the spring switch contacts 182 and 183 through leads 203 and 204 respectively. The remaining side of the transformer secondary 196 is connected through conductor 205 to one side of selector switch means comprising switches 206 and 207 which are respectively connected through conductors 208 and 209 to the spring switch contacts 182 and 183.

Assuming now that the members 171 and 172 are in their normal down or first position, in which position the member 171 is shown, the closing of switch 206 will establish a circuit through lead 208, lead 203, holding coil 176, lead 199, lead 197, transformer secondary 196, and lead 205, back to switch 206. This will energize the holding coil 176 and establish one value of magnetic flux therethrough. However, the magnetic circuit of this holding coil is so proportioned that the magnetic field through the plug 174a produced by the holding coil is insufficient to cause the magnetic armature 187 to draw down and break the connection between the contacts 182 and 184, as long as the magnetically permeable shank 171a is in the position shown. Consequently, connection is also established through the switch contacts 182 and 184, leads 201 and 202, main solenoid 191, lead 198, and lead 197, back to the transformer secondary.

This causes energization of the main holding operating solenoid 191 and causes the upward movement of the core 192, which through the yoke 193 engaging the flanges 171b and 172b lifts the members 171 and 172 to their second positions, in which position the member 172 is shown. The movement of the shank 171a into the core 174 and into close proximity of the plug 174a reduces the reluctance of the magnetic circuit through the holding solenoid 176 to such an extent that the increase in flux to greater value than it was initially causes the magnetically permeable armature 187 to move downward into contact with the plug 174a and break the connection between the contact 182 and the contact 184. This deenergizes the main operating solenoid and allows the core 192 and yoke 193 to return to the lower position shown in Fig. 4. At the same time the member 171 is held in its second position by magnetic attraction.

Opening the switch 206 will return the member 171 to its first position as shown. The member 172 is shown in its second position and the corresponding selector switch therefor is shown closed. Opening the switch 207 to place it in the position shown by the dot-dash lines at 207a will return the member 172 to its first position.

Although I have only shown my apparatus with two or three members to be controlled, the advantages thereof may be realized when using only a single member or with more than three members. Obviously my invention is not limited for use on valves nor is it necessary for all the members to be controlled to form part of a single control device. For example, in Fig. 1 each of the valve plungers may be positioned in a separate valve.

When using my apparatus for the control of a variable flow valve such as shown in Fig. 1, the selector switch means comprising the switches 55, 56, and 57, may be incorporated in a multi-contact thermostat of any of the well known types. It should be apparent that the switches may be controlled manually or each switch may be controlled automatically so as to be responsive to different conditions, since the members to be controlled may operate separate devices whose operations depend upon separate conditions.

In order to simplify the drawings a cover for the control apparatus has been omitted in each of the figures. It is generally preferable to provide each apparatus with a tight-fitting cover in a manner well known to the art so as to protect the apparatus and prevent the leakage of fluid especially when the control apparatus is used as a variable flow gas valve.

It should be apparent that my apparatus is subject to considerable modification, and hence I do not choose to be limited to the illustrative forms described herein but rather to the scope of the appended claims.

I claim:

1. In an electrically operated control device, the combination which comprises: a member to be controlled having a first position and a second position and being biased toward the first position; actuating means movable toward and away from a rest position and operable upon movement away from the rest position to move said member toward its second position; a first operating coil associated with said actuating means and operable upon electrical energization to move said actuating means away from its rest position to cause movement of said member toward its second position; a second operating coil operable upon electrical energization to hold said member to be controlled in its second position; and switch means operated in response to the change in position of said member to first deenergize the first coil and then energize the second coil, whereby said actuating means is allowed to return to its rest position and said member is held in its second position.

2. In an electrically operated control device, the combination which comprises: a plurality of members to be controlled, each having a first position and a second position and each being biased toward its first position; a first operating coil operable upon electrical energization to move all of said members to their second positions; a plurality of second operating coils, each cooperating with one of said members and each operable upon electrical energization to hold its associated member in its second position; and means operated in response to the change in position of a member which is to be held in its second position by energization of its associated second operating coil, for deenergizing the first operating coil.

3. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members to their second positions upon electrical energization of said main coil; and means operated in response to the change in position of a selected one of said members, for deenergizing said main coil when said selected member is in position to be held by its associated holding coil.

4. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member has been moved to its second position; movable actuating means adapted to engage said plurality of members and cause simultaneous movement thereof toward their second positions; a main operating coil adapted upon electrical energization to move said actuating means; and switch means operated in response to the change in position of a selected one of said members for deenergizing said main coil.

5. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members toward their second positions upon electrical energization of said main coil; a plurality of separate pairs of parallel-connected branch circuits; separate switch means for each of said pairs of circuits for alternatively connecting one of said circuits of said pair in series with said main coil or for connecting one of said circuits of said pair in series with a separate one of the holding coils, each of said switch means being associated with a separate one of said members and being operable to maintain the series connection through the main coil when its associated member is in its first position and to maintain the series circuit through its associated holding coil when its associated member is in its second position; and selector switch means for causing selective energization of said branch circuits.

6. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members toward their second positions upon electrical energization of said main coil; a plurality of main electric series circuits through said main coil, said series circuits each including a pair of separate parallel-connected branch circuits, one of said branch circuits being in series with said main coil; two position switch means for each pair of said branch circuits, each of said switch means being operable in response to the movement of a separate member toward its second position to open said one of its associated branch circuits and to establish a circuit through its associated holding coil through the other one of its branch circuits when its associated member is in its second position; and selector switch means for selectively energizing said branch circuits to cause sequential energization and deenergization of said main coil and the selective energization of said holding coil upon the operation of said two position switch means.

7. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members toward their second positions upon electrical energization of said main coil; separate switch arms associated with each of said members; a first contact and a second contact for each of said switch arms, each of said switch arms contacting its first contact when its associated member is in its first position and each of said switch arms being moved from its first contact by movement of its associated member toward its second position so as to maintain contact with its second contact when its associated member is in its second position; a plurality of separate series electric circuits through said main coil, each of said series circuits including a series connection through a separate one of said switch arms and its associated first contact; selector switch means for causing the selective energization of said circuits to thereby energize said main coil and move said members toward their second positions; and an electric circuit from each of said second contacts through its associated holding coil, whereby the establishment of a connection between the switch arm and its second contact in an energized branch circuit will cause energization of the holding coil associated with said second contact.

8. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members toward their second positions upon electrical energization of said main coil; a separate series circuit through each of said holding coils; a separate series circuit in parallel with each of said first-named circuits and each including said main coil as a part thereof; separate switch means in each of said last-named circuits, each of said switch means being associated with a different member and each of said switch means being closed when its associated member is in its first position and being operated in response to movement of its associated member to remain open when its associated member is in its second position; and means for selectively energizing said first-named circuits.

9. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members toward their second positions upon electrical energization of said main coil; a separate series holding circuit through each of said holding coils; a separate series circuit in parallel with each of said holding circuits and each including said main coil as a part thereof, said last-named circuits being normally closed when said members are in their first positions; means for selectively energizing the holding circuits to thus energize the main coil through a selected one of said second-named circuits; and means responsive to movement of the member associated with the selected holding circuit for opening said selected one of said second-named circuits when said member is in its second position and thereby deenergize said main coil.

10. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members toward their second positions upon electrical energization of said main coil; a separate series holding circuit through each of said holding coils; a separate series circuit in parallel with each of said holding circuits and each including said main coil as a part thereof, said last-named circuits being normally closed when said members are in their first positions; means for selectively energizing the holding circuits to thus energize the main coil through a selected one of said second-named circuits and also to energize a selected holding coil to produce one value of magnetic flux therethrough; and means operated by a greater value of magnetic flux through the selected holding coil for opening said selected one of said second-mentioned circuits and thereby deenergizing said main coil.

11. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members toward their second positions upon electrical energization of said main coil; a separate series holding circuit through each of said holding coils; a separate series circuit in parallel with each of said holding circuits and each including said main coil as a part thereof, said last-named circuits being normally closed when said members are in their first positions; means for selectively energizing the first-named circuits to thus energize the main coil through a selected one of said second-named circuits; and means engaged by the member associated with the selected holding coil for opening said selected one of said second-named circuits when said member is in its second position and thereby deenergizing said main coil.

12. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members toward their second positions upon electrical energization of said main coil; a plurality of electric circuits; means for selectively energizing said circuits to provide for the energization of the main coil and the energization of a selected holding coil when its member is in its second position; and switch means engaged by said selected member in its second position for deenergizing said main coil.

13. In an electrically operated control device, the combination which comprises: a plurality of members to be controlled, each having a first position and a second position and each being biased toward its first position; a plurality of holding coils each associated with one of said members and each adapted after electrical energization to hold its associated member in its second position when said associated member is in its second position; a main coil for simultaneously moving said plurality of members toward their second positions upon electrical energization of said main coil; a plurality of electric circuits; means for selectively energizing said circuits to provide for the energization of the main coil and the energization of a selected holding coil when its member is in its second position; and switch means located adjacent said selected member and engaged by an end of said member in its second position for deenergizing said main coil.

ROBERT L. GUNTER.